March 29, 1960 L. R. F. HARRIS 2,930,852

ALTERNATING CURRENT SIGNAL RECEIVING APPARATUS

Filed March 31, 1955 4 Sheets-Sheet 1

LIONEL R. F. HARRIS
INVENTOR

BY Hall & Houghton
ATTORNEY

March 29, 1960 L. R. F. HARRIS 2,930,852

ALTERNATING CURRENT SIGNAL RECEIVING APPARATUS

Filed March 31, 1955 4 Sheets-Sheet 2

INVENTOR
LIONEL R. F. HARRIS
BY Hall & Houghton
ATTORNEY

March 29, 1960 L. R. F. HARRIS 2,930,852

ALTERNATING CURRENT SIGNAL RECEIVING APPARATUS

Filed March 31, 1955 4 Sheets-Sheet 3

INVENTOR
LIONEL R. F. HARRIS
BY Hall & Houghton
ATTORNEY

INVENTOR
LIONEL R. F. HARRIS
BY Hall & Houghton
ATTORNEY

United States Patent Office 2,930,852
Patented Mar. 29, 1960

2,930,852

ALTERNATING CURRENT SIGNAL RECEIVING APPARATUS

Lionel Roy Frank Harris, Kenton, England, assignor to Her Majesty's Postmaster General, London, England Application March 31, 1955, Serial No. 498,376

Claims priority, application Great Britain April 8, 1954

10 Claims. (Cl. 179—15)

Figure 1A:
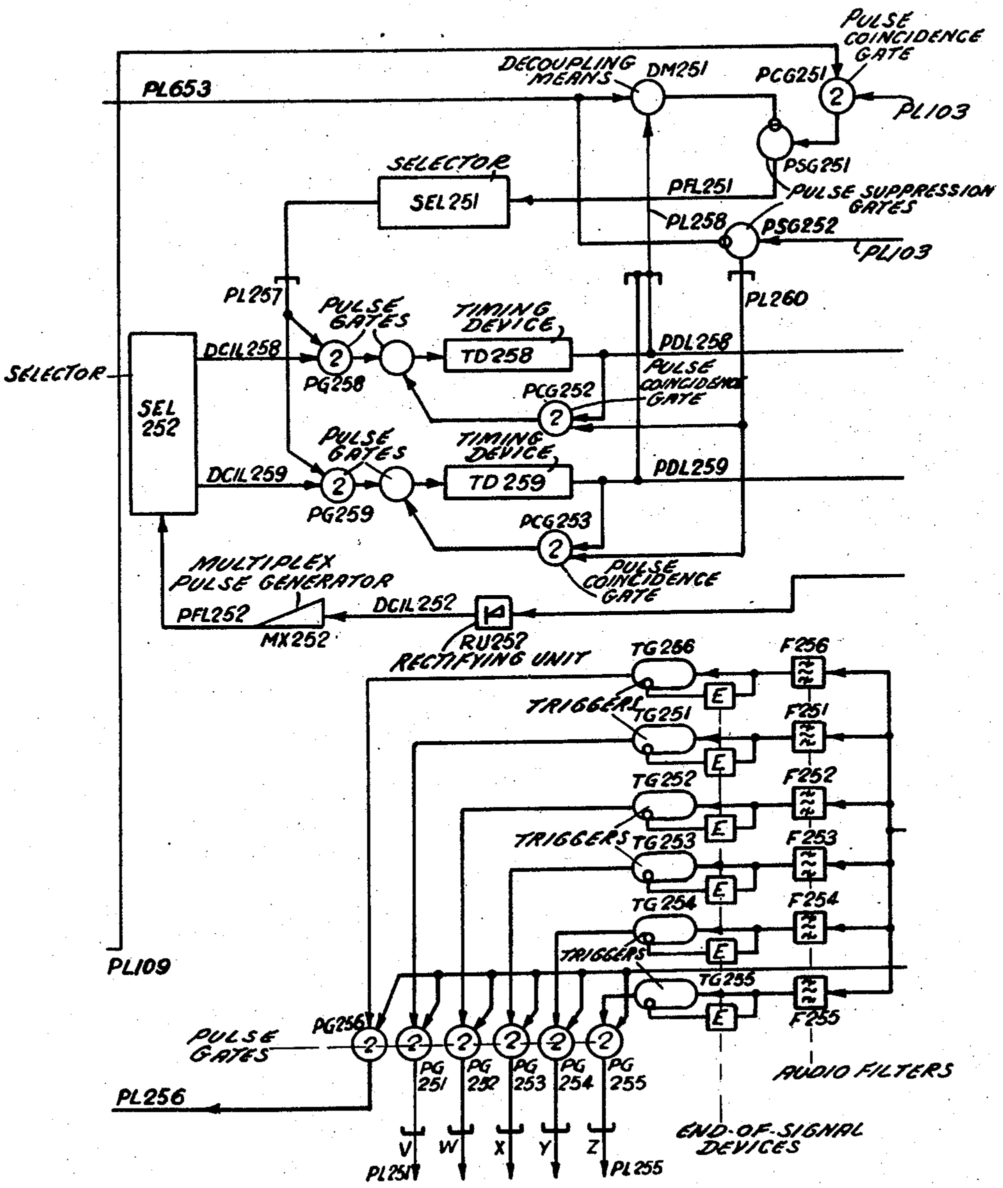

This invention relates to apparatus for the reception of alternating current signals from a plurality of sources. In particular it relates to the reception of V.F. signals by apparatus in automatic telephone exchanges.

In automatic telephony, alternating current signals such as voice frequency signals are widely used for signalling between exchanges over junctions and exchanges and manual boards and between exchanges and subscribers.

For example in register marker telephone systems designation information from a calling circuit may be passed to the register in the form of coded signals as for example dial impulses, supervisory signals and signals identifying a calling circuit which may not be directly connected to the succeeding exchange. Supervisory signals such as answer, number unobtainable, busy and ringing may be received from a called circuit in the form of voice frequency signals which may be coded.

Voice frequency signals must be detected by a voice frequency receiver associated with the individual calling circuit. Since the signalling information to be stored in the register may be transmitted in a period much less than the holding time of the register it is an advantage to connect a voice frequency receiver to a calling circuit only when signalling information is being received, and to release the receiver as soon as the information has been received and stored in the register.

According to the present invention apparatus for receiving alternating current signals from a number of sources comprises means for indicating when a source is transmitting signals and further means for placing an alternating current receiver in communication with one of the sources when that source is indicated as transmitting signals, the arrangement being such that communication between the receiver and the source is only maintained during a part at least of each signal transmitted by the source.

The expression "signal" used in this specification is intended to denote only the individual component parts of a complete transmission from a source as distinct from the complete transmission itself.

In an embodiment of the invention source selecting means are provided to which indication by the indicating means is made when a source is transmitting, the source selecting means operating to allow the further means to place the receiver in communication with that one of the sources indicating as transmitting a signal which is selected by the source selecting means.

The receiver may be one of a plurality of receivers and is selected from amongst such of the plurality not in communication with the sources.

The alternating current signals are normally of a frequency lying in the audio range and are referred to herein as voice frequency (V.F.) signals. By adopting apparatus according to the invention, considerable economy in receivers results.

One application of the invention is to a telephone exchange system using time division multiplex for connecting circuits to a register and effecting the register functions, each register input connection being permanently associated with a register pulse train. The register connection includes means for detecting voice frequency signals and the detection of such signals causes the associated register pulse train to appear on a lead common to all the register connections in the group. This lead is connected to a selecting means which selects one of the pulse trains from the combination of register pulse trains indicating circuits receiving voice frequency signals.

Each voice frequency receiver is associated with a pulse train generated by a multiplex and this pulse train can be different from any of the register pulse trains. Free voice frequency receivers cause their associated pulse trains to appear on a lead connected to selecting means which selects a single pulse train thus selecting one only of the free voice frequency receivers. The selected voice frequency receiver is indicated by a combination of indicating leads each of which is connected to a storage device in a group of storage devices. Each storage device may comprise a timing device capable of storing any combination of the register pulse trains such as a mercury delay line circulating system of appropriate length. The selected register pulse train is indicated to all the storage devices in the group but the register pulse train is only stored in the combination of storage devices indicated by the combination of indicating leads denoting the selected voice frequency receiver. The appearance of the register pulse train in the output of the storage device is used to suppress the coincident register pulse train from the input to the register pulse train selector which is released to make another selection from the combination of register pulse trains denoting circuits receiving voice frequency signals.

The combination of storage devices which denotes the selected voice frequency receiver is connected to a modulator to which is connected a lead common to all the register input connections. The audio input to the register connection which contains the voice frequency signals is caused to modulate the associated register pulse train so that on the common lead appear modulated pulses and on the output from the modulator denoting the selected voice frequency receiver appears the modulated register pulse train coincident with the pulse train which has been stored in the combination of storage devices. When no audio signal is being received unmodulated pulses will appear on the output from the modulator associated with the voice frequency receiver: this pluse train is connected to a demodulator and amplifier from which is derived a hold signal which is used to suppress the pulse train associated with the voice frequency receiver so that the selecting means is released to make another selection of a free voice frequency receiver.

The audio signal derived from the demodulator and amplifier is connected to the voice frequency receiver which detects the signals and produces an indication on a lead individual to each signal received. This indication causes the register pulse train from the combination of storage devices to appear on an individual lead so that for every voice frequency signal detected the register pulse train appears on a corresponding lead which is connected to the register storage devices.

Dialling pulses may be received as combinations of two or more frequencies in a group of voice frequencies and the detection of such signals will cause the register pulse train to appear on the associated combination of leads.

The signalling information received from a calling circuit may include special information in addition to that necessary to route the call to the required circuit. Such information might denote the identity of a calling exchange not directly connected a request for charging information or special instructions denoting particular action to be taken, contingent on certain circumstances being encountered in the progress of the call. Such information may be received as individual voice frequency signals or coded voice frequency signals. The decoded signals can be made to produce the associated register pulse train on leads or combinations of leads connected to the register storage devices.

Forms of coded pulse signals with signals of predetermined duration may be guarded in the same way.

Figures 1B, 3:
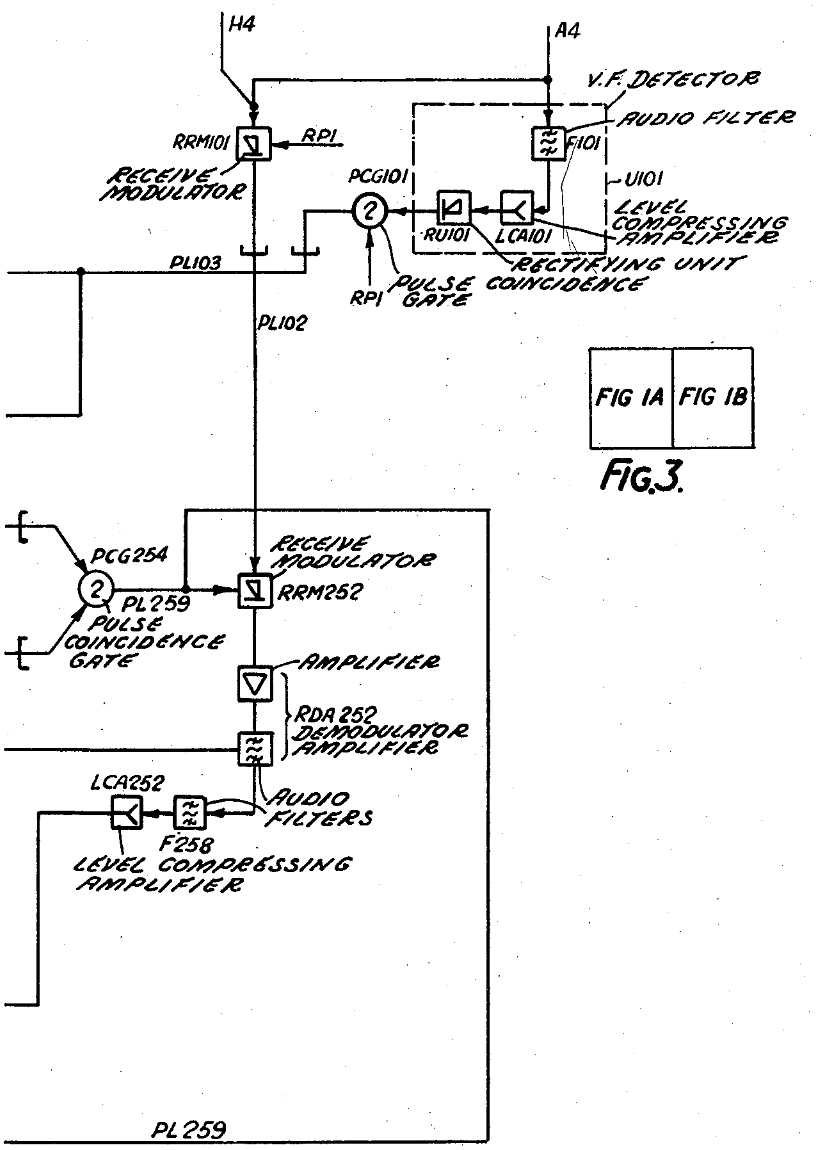
Figure 2A:
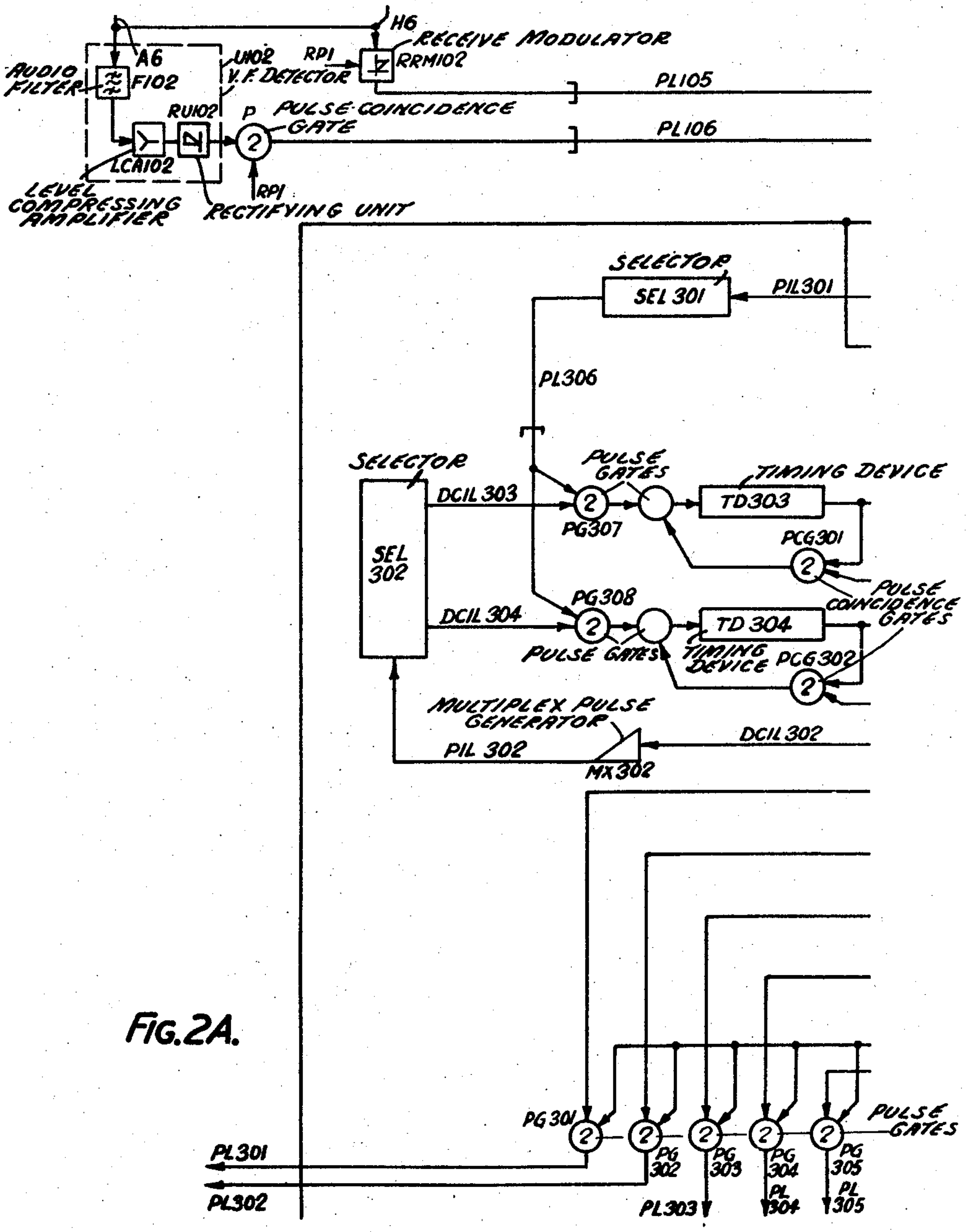
Figure 2B:
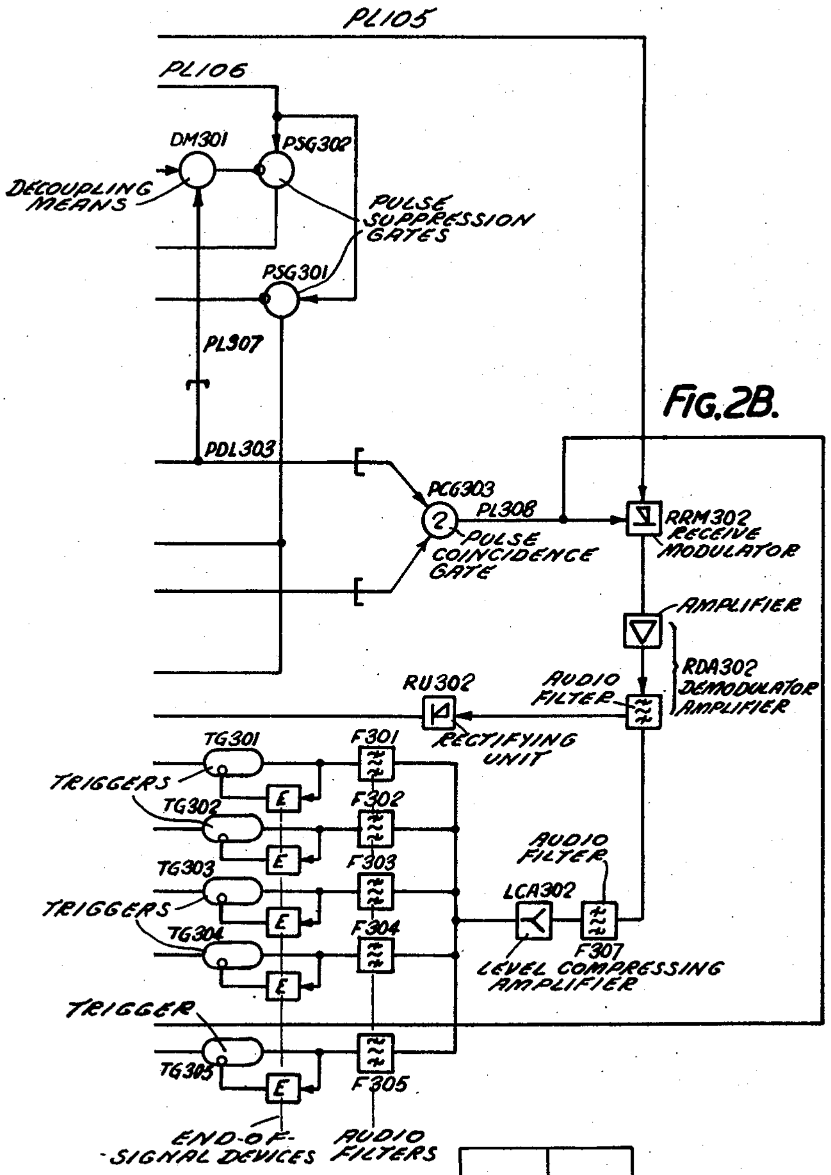
Figure 4:
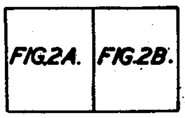

As examples of embodiments of the invention two forms of apparatus in accordance therewith and suitable for telephone exchange systems employing time division multiplex will now be described in greater detail with reference to the accompanying drawings of which:

Figs. 1A and 1B assembled as shown in Fig. 3 show a block schematic circuit diagram of calling circuit-register V.F. connections and Figs. 2A and 2B assembled as shown in Fig. 4 show a block schematic circuit diagram of called circuit-register V.F. connections.

In the embodiment illustrated in Figs. 1A and 1B the calling circuit to register connections described in the specification of co-pending application No. 471,072 in the name of L. R. F. Harris provide an audio input to the selected register on lead A4 and the D.C. hold derived when pulses are received is connected to the register on lead H4.

The audio input lead A4 is connected to a voice frequency detector unit U101 which causes the register pulse train permanently associated with the particular register connection to appear on an output lead whenever an audio signal is received. The audio lead A4 is connected to an audio filter F101 which has a pass-band sufficient to pass all signalling frequencies but will not pass interference frequencies outside the signalling band. The output from F101 is connected to a level stabilising device LCA101 which may be a level compressing amplifier, voltage limiter or an amplifier with voltage limiting. As only signal frequencies are passed to LCA101 and it is required to detect the presence of such signals, the harmonic distortion introduced by limiting may be tolerated. The voltage stabilised output from LCA101 is connected to rectifying unit RU101 which produces a D.C. indication on a lead connected to pulse coincidence gate PCG101 to which the register pulse train RP1 associated with the connection is also applied. Thus whenever an audio signal is detected the register pulse train will appear on a lead from PCG101. The output leads from all the groups of voice frequency detector units are connected to a common pulse lead PL103. The voltage stabilising and rectifying unit will have a time constant causing delay in detecting a signal and delay in releasing after a signal has been removed: these delays may be used to guard against spurious short interruptions to the received signal and transient interference at the signal frequencies.

The audio input A4 and the D.C. hold H4 in the register connection are connected to a register receive modulator RRM101 which causes the register pulse train RP1 to appear on the output lead when the D.C. hold is applied; the register pulse train is modulated by the audio signal on lead A4. The outputs from all the register receive modulators such as RRM101 are connected to a common pulse lead PL102.

Pulse lead PL103 is connected to a pulse coincidence gate PCG251 to which is also connected pulse lead PL109 on which appear the register pulse trains of all the calling circuits which are expected to receive voice frequency signals. On the output lead from pulse coincidence gate PCG251 appear the pulse trains of all the calling circuits which are expected to receive voice frequency signals and are receiving such signals: these pulse trains are applied to pulse suppression gate PSG251. The register pulse trains in use with busy voice frequency receivers appear on PL258 and the register pulse trains of circuits to be guarded after the receipt of a signal appear on register guard lead PL653 and are connected via decoupling means DM251 to pulse suppression gate PSG251 and suppress the coincident register pulse trains on the output from PCG251.

The pulse trains appearing on the output from PSG251 are applied by pulse free lead PFL251 to the selecting means SEL251. Thus the register pulse trains of those circuits which are expected to receive voice frequency signals and are receiving such signals and are not already in use in a voice frequency receiver and are not appearing on the register guard lead PL653 after a signal has been received, are connected to the selecting means SEL251. A selection is made of one of the register pulse trains and the selected pulse train is indicated on pulse lead PL257. The selecting means may take the form described in U.S. patent specification No. 2,727,094.

Each voice frequency receiver is associated with a pulse train and the pulse trains of free receivers are generated by multiplex pulse generator MX252 and connected to pulse free lead PFL252. The pulse trains of free voice frequency receivers on PFL252 are connected to selecting means SEL252 which selects one of the pulse trains and thus selects one of the voice frequency receivers. The selecting means SEL252 indicates the selected voice frequency receiver by a combination of D.C. indicating leads DCIL258 and DCIL259 which are connected to pulse gates PG258 and PG259 whose outputs are connected to the inputs of timing devices TD258 and TD259. The combination of timing devices TD258 and TD259 which corresponds to the combination of D.C. indicating leads DCIL258 and DCIL259 thus denotes the selected voice frequency receiver. The selecting means SEL252 may also be of the kind described in U.S. patent specification No. 2,727,094.

The selected register pulse train on pulse lead PL257 is connected to all the pulse gates such as PG258 and PG259 in the group of timing devices and the pulse train appears on the outputs of the pulse gates indicated by D.C. indicating leads DCIL258 and DCIL259. The selected register pulse train is stored in the combination of timing devices TD258 and 259 and appears on the output pulse distribution leads PDL258 and PDL259. The combination of pulse leads PDL258 and PDL259 which denote the selected voice frequency receiver are connected to pulse coincidence gate PCG254 so that only the register pulse train stored in both TD258 and TD259 appears on the output lead PL259. Pulse PL259 is connected to register receive modulator RRM252 to which pulse lead PL102 is also connected. The modulated pulse trains of all the calling circuits appear on pulse lead PL102 so that on the output lead from RRM252 appears the modulated register pulse train coincident with the register pulse train selected for use with the voice frequency receiver denoted by the combination of timing devices TD258 and TD259. The output from register receive modulator RRM252 is connected to register demodulator and amplifier RDA252 from which the audio modulation containing the voice frequency signal is derived. A hold signal is also derived from RDA252 and connected to rectifying unit RU252 which produces a D.C. indication on lead DCIL252. The D.C. indication on DCIL252 is connected to multiplex MX252 to suppress the pulse train of the selected voice frequency receiver which does not then appear on pulse free lead PFL252. Selecting means SEL252 is released to make another selection of a free voice frequency receiver if another circuit is calling.

The pulse trains appearing on the pulse distribution leads such as PDL258 from the timing devices, are commoned to pulse lead PL258 which is connected by decoupling means DM251 to pulse suppression gate PSG251. Thus selected register pulse train is suppressed and does not appear on pulse free lead PFL251 selecting means SEL251 is released to make another selection of a register pulse train associated with a calling circuit requiring a voice frequency receiver.

The rectifying unit RU252 is arranged to have a release lag greater than the hangover time of the voice frequency receiver so that the receiver cannot be selected again and audio signal from another circuit connected before the receiver has restored to its unoperated state.

The register pulse trains of calling circuits which appear on pulse lead PL103 are applied to pulse suppression gate PSG252 to which are also applied the pulse trains appearing on the register guard lead PL653. The pulse trains coincident with those on PL653 are suppressed and do not appear on the output lead from PSG252. The output pulse lead PL260 from PSG252 is used to maintain the register pulse trains in the timing devices. Pulse distribution lead PDL258 is connected to pulse coincidence gate PCG252 to which pulse lead PL260 is also connected. Thus on the output from pulse coincidence gate PCG252 appear those coincidence pulse trains on the output from TD258 which also appear on the hold lead PL260: these pulse trains are connected to the input of TD258. Disappearance of the coincidence pulse train from pulse head PL260 causes the pulse train to be deleted from the timing device in which it had been stored.

When the register pulse trains selected for use with a particular voice frequency receiver is suppressed at pulse suppression gate PSG252 the pulse train will be deleted from the combination of timing devices denoting the voice frequency receiver: the disappearance of the register pulse train from the output of the associated register receive modulator RRM252 causes the hold signal to disappear from multiplex MX252 after a period timed by the delayed release of rectifying unit RU252. The voice frequency receiver is then indicated free by the appearance of the associated pulse train on pulse free lead PFL252.

To use the voice frequency receiver most efficiently it is arranged to release the receiver immediately a signal has been decoded and stored in the common registry stores. When the signal has been stored the associated register pulse train is caused to appear on register guard lead PL653 which by suppressing the coincidence pulse train in pulse suppression gate PSG252 causes the voice frequency receiver to be released. To prevent this register pulse train from being again selected by selecting means SEL251 pulse lead PL653 is also connected via DM251 to pulse suppression gate PSG251. The register pulse train on register guard lead PL653 is maintained until the voice frequency signal received is known to have disappeared and been replaced by a different signal or none. This guard time depends upon the signalling code being used and may be varied if the signalling information is received from another register or some formed of voice frequency sender such as a manual board keysender.

The audio output derived from register demodulator and amplifier RDA252 is connected to an audio filter F258 which has a pass band restricted to the signalling frequencies to be received. The output from F258 is connected to a voltage stabilising device such as a level compressing amplifier LCA252. The voltage stabiliser is necessary since the input level of voice frequency signals varies and in a multi link connection end to end signals may be expected to vary over a wide range of levels. A device such as a level compressing amplifier which has a variable gain characteristic must be preceded by a filter to exclude frequencies outside the signalling band to prevent interference frequencies at a high level setting the gain of the level compressor while genuine signals at a low level are being received.

The audio signal output from LCA252 is connected to audio filters such as F251 to F256 which separate the combination of signal frequencies into a single output for each signal frequency. The outputs from the signal filters F251–6 are connected respectively to registering means such as triggers TG251–6 which are arranged to produce a D.C. output whenever an audio signal frequency is received and to release when the audio signal is removed. Removal of the audio signal causes end of signal devices E to operate to release their associated triggers. The end of signal device E, as will be clear to those skilled in the art, may be defined as a circuit which supplies an output signal which persists for a predetermined time on the termination of an input signal applied to the circuit.

The frequency discrimination of the signal filters and the frequency spacing of the signal frequencies are such as to ensure a predetermined minimum voltage output from the signal filter sufficient to operate the registering means with signal inputs varying over a given level range and with a given maximum difference in signal level between signals when a combination of signalling frequencies is used. The signal filters discrimination is such as to ensure that signal frequencies in an adjacent signalling band do not produce an output sufficient to operate the registering means. Thus trigger circuit TG252 is operated only by a genuine signal in the designed pass band of filter F252 and is not operated by signal in the pass band of filter F253 or F251 over the range of signal levels to be used.

The D.C. outputs from the trigger circuits TG251–TG256 are connected to pulse gates PG251–256 to which pulse lead PL259 is also connected. The register pulse train in use by the particular voice frequency receiver appears on pulse lead PL259 so that when an audio signal is received by a trigger circuit such as TG251 the D.C. output to the associated pulse gate PG251 such that the register pulse train appears on the output lead PL251 from PG251. A signal consisting of several signal frequencies will cause the register pulse train to appear on the pulse leads such as PL251 associated with each individual frequency.

Thus in one application dial impulses are received as combinations of two frequencies in a group of five frequencies and the voice frequency receiver will cause the register pulse train to appear on two pulse leads such as PL251 and PL253 in a group of five pulse leads.

Special information may be passed by using a voice frequency signal such as for example a "charge wanted" signal which may be received as a single frequency which causes the register pulse train to appear on pulse lead PL256. The appearance of the register pulse train on pulse lead PL256 is an indication to the register that the calling circuit requires charging information which can be sent back when the designation information from the calling circuit has been received.

Combinations of the signal frequencies which cause the register pulse train to appear on combinations of pulse leads such as PL251–6 may be used to pass special information such as instructions to make a second trial if the first attempt to route the call is unsuccessful. The identity of an originating circuit may be thus indicated when the circuit is not directly connected to the exchange.

To use the voice frequency receiver most efficiently the receiver can be released as soon as a signal has been received in the register storage devices and before the voice frequency signal has been removed. The register pulse train associated with the signal may be suppressed and not included in the pulse trains connected to the selecting means. The period for which the pulse train is suppressed depends on the signalling code adopted. The signalling information may be received in the form of continuous voice frequency signals and when the information has been stored in the register a backward signal is sent to the originating exchange to cut off the forward signal which may then be followed by a further signal. The guarding signal in the register will then be maintained for a period relating to the duration of the backward signal and to the transmission and response times involved in passing the signal between the two exchanges and receiving such signal. Transient interruptions to the forward and backward signals may be marked by suitable timing of the register guard signals.

Alternatively, the signals may be received in the form of voice frequency coded pulses as for example combinations of frequencies from a manual board keysending apparatus when the duration of the signals depends upon the speed at which the operator indicates the information to be sent. The guarding signal on PL653 in the register applied when the incoming signal has been stored in the register may be maintained until the incoming signal is removed. Since it is well known that transient interruptions to the incoming signal may occur, the guard signal may be maintained for a period after the incoming signal has been removed sufficient to ensure a transient interruption is not mistaken for the end of the signal so that the same signal is stored more than once.

The called circuits to register connections described in the specification of co-pending application No. 471,072 in the name of L. R. F. Harris provide an audio input to the selected register on lead A6 and the D.C. hold derived when pulses are received is connected to the register on lead H6 shown in Figures 2A and 2B.

The audio input lead A6 is connected to a voice frequency detector unit U102 which causes the register pulse train permanently associated with the particular register connection to appear on output lead PL106 which is connected to each voice frequency detector unit in the group of register connections. The functions of the detector units are the same as previously described for the calling circuit connection. The register pulse train modulated by the audio signal appears on pulse lead PL105 which is common to all the register connections. Pulse lead PL106 is connected to pulse suppression gate PSG302 to which are applied the register pulse trains in use in busy voice frequency receivers and the pulse trains of circuits to be guarded after receipt of a signal. On pulse indicating lead PFL301 the output of PSG302 appear the pulse trains of circuits receiving voice frequency signals which are not connected to a voice frequency receiver and are not being guarded after receipt of a signal.

The selection of a register pulse train requiring connection to a voice frequency receiver and the selection of a receiver are as described previously. The register pulse train stored in the combination of timing devices denoting the selected voice frequency receiver gates the coincident modulated register pulse train to the receiver: the demodulation and separation of the audio signals to produce the register pulse trains on leads individual to the signal frequency are as described previously.

Among the signals in the form of voice frequencies to be received from a called circuit may be stop sending, ring, answer indication, number unobtainable and busy signals. These signals may be received as individual frequencies which cause the register pulse train to appear on a pulse lead such as PL303 to indicate stop sending.

Information may be received in the form of combinations of frequencies which cause the register pulse train to appear on combination of the pulse leads such as PL301–5. Such information may include the charge to be made for a call.

It will be clear that a delay will occur between the receipt of a signal on an audio lead such as A4 and the appearance of the register pulse train on pulse lead PL251–6 due to the response time of the voice frequency detector, the time to select a voice frequency receiver, and the response time of the voice frequency receiver. The selection time and voice frequency receiver response times are made small to reduce the number of receivers required. The response time of the voice frequency detector affects the holding time of the register but this response time may be used to guard against transient interference at the signalling frequencies. The voice frequency receiver hangover time which reduces the availability of receiver for further use, is made small.

Although in the embodiments described above a group of the voice frequency receivers is used from which one is selected, it will be understood that where traffic conditions permit a single receiver will be sufficient. No circuitry for selecting a receiver will then be necessary. The operation of such a system is generally similar to that of the embodiments described above and in the event that a number of circuits are transmitting signals simultaneously, one of these circuits will be selected and placed in communication with the receiver. When communication between that source and the receiver has been terminated another source is selected and placed in communication with the receiver and so on.

I claim:

1. Apparatus for receiving alternating current signals from a number of sources comprising in combination an alternating current detector for detecting the presence of an alternating current signal from a source and producing an indication on detection of an alternating current signal, source selecting means to which the indication is applied and which selects one source indicated as transmitting a signal, means controlled by the source selecting means for placing the selected source in communication with an alternating current signal receiver, information storing means for receiving from said receiver information represented by the signal and for carrying out the storage thereof, communication between said one source and said receiver being maintained only until the information is stored.

2. Apparatus for receiving alternating current signals from a number of sources comprising in combination an alternating current detector for detecting the presence of an alternating current signal from a source and producing an indication on detection of an alternating current signal, source selecting means to which the indication is applied and which selects one source indicated as transmitting a signal, a plurality of alternating current signal receivers, receiver selecting means for selecting and indicating a free receiver of the plurality of receivers, connecting means controlled by the source selecting means for placing the selected source in communication with the selected and indicated receiver, and information storing means for receiving from the receiver information represented by the signal and for carrying out the storage thereof, communication between the selected source and the selected receiver being maintained only until the information is stored.

3. Apparatus for receiving alternating current signals from a number of sources comprising in combination alternating current signal detecting means for detecting the presence of an alternating current signal from a source and for causing a characteristic pulse train to appear for each source transmitting a signal, source selecting means to which each said characteristic pulse train is applied and which is operable to select one of the pulse trains applied to it, a plurality of alternating current signal receivers, receiver selecting means for selecting and indicating a free receiver of the plurality of receivers, connecting means controlled by the source selecting means for placing that one of the sources characterized by the selected pulse train in communication with the selected and indicated receiver, and information storing means for receiving from the receiver information represented by the signal and for carrying out the storage thereof, communication between the selected source and the selected receiver being maintained only until the information is stored.

4. Apparatus for receiving alternating current signals from a number of sources comprising in combination alternating current signal detecting means for detecting the presence of an alternating current signal from a source and for causing a characteristic pulse train to appear for each source transmitting a signal, source selecting means to which each said characteristic pulse train is applied and which is operable to select one of the pulse trains applied to it, a plurality of pulse train storage devices, a plurality of alternating current signal receivers, each receiver being connected with a unique combination of storage devices, receiver selecting means for selecting a free receiver of the plurality of receivers and for applying an indicating signal to the unique combination of storage devices connected with the selected receiver, means for inserting into each device of the indicated combination the pulse train selected by the source selecting means, connecting means joined to said indicated combination of storage devices for placing that one of the sources characterized by the selected pulse train in communication with the selected receiver, and information storing means for receiving from the receiver information represented by the signal and for carrying out the storage thereof, communication between the selected source and the selected receiver being maintained only until the information is stored.

5. Apparatus for receiving alternating current signals from a number of sources comprising in combination means for indicating the presence of an alternating current signal from a source, source selecting means to which the indication is applied and which selects one source indicated as transmitting a signal, a plurality of alternating current signal receivers, pulse train generating means for producing a characteristic pulse train for each free receiver, receiver selecting means to which each such characteristic pulse train is applied and which is operable to select one of the applied pulse trains, connecting means controlled by the source selecting means for placing the selected source in communication with that receiver characterized by the pulse train selected by the receiver selecting means and information storing means for receiving from the receiver information represented by the signal and for carrying out the storage thereof, communication between the selected source and the selected receiver being maintained only until the information is stored.

6. Apparatus for receiving alternating current signals from a number of sources comprising in combination alternating current signal detecting means for detecting the presence of an alternating current signal from a source and for causing a characteristic pulse train to appear for each source transmitting a signal, source selecting means to which each such characteristic pulse train is applied and which is operable to select one of the applied pulse trains, a plurality of alternating current signal receivers, receiver selecting means for selecting and indicating a free receiver of the plurality of receivers, connecting means controlled by the source selecting means for placing in communication during the pulses of said selected pulse train only, the selected and indicated receiver and the source characterized by the selected pulse train, and information storing means for receiving from the receiver information represented by the signal and for carrying out the storage thereof, communication between the selected source and the selected receiver being maintained only until the information is stored.

7. Apparatus for receiving alternating current signals from a number of sources comprising in combination alternating current signal detecting means for detecting the presence of an alternating current signal from a source and for causing a characteristic pulse train to appear for each source transmitting signal, source selecting means to which each said characteristic pulse train is applied and which is operable to select one of the pulse trains applied to it, a plurality of pulse train storage devices, a plurality of alternating current signal receivers, each receiver being connected with a unique combination of storage devices, receiver selecting means for selecting a free receiver of the plurality of receivers and for applying an indicating signal to the unique combination of storage devices connected with the selected receiver, means for inserting into each device of the indicated combination the pulse train selected by the source selecting means, pulse train modulating means connected to said indicated combination of storage devices and to which are applied the signals from the source characterized by the selected pulse train for placing said source in communication with the selected receiver, and information storing means for receiving from the receiver information represented by the signal and for carrying out the storage thereof, communication between the selected source and the selected receiver being maintained only until the information is stored.

8. Apparatus for receiving alternating current signals as claimed in claim 3 and further comprising pulse train comparison means to which the characteristic pulse trains are applied together with the characteristic pulse trains of sources in communication with receivers and those of sources to be guarded against being placed in communication with receivers, the output of the pulse comparison means consisting of pulse trains characterizing sources requiring communication with receivers, and means for applying said output to the source selecting means.

9. Apparatus for receiving alternating current signals from a number of sources comprising in combination alternating current signal detecting means for detecting the presence of an alternating current signal from a source and for causing a characteristic pulse train to appear for each source transmitting a signal, source selecting means to which each said characteristic pulse train is applied and which is operable to select one of the pulse trains applied to it, a plurality of alternating current signal receivers each comprising a number of band pass filters, and for each filter a trigger device for converting a signal passed by the filter into a pulse, receiver selecting means for selecting and indicating a free receiver of the plurality of receivers, connecting means controlled by the source selecting means for placing that one of the sources characterized by the selected pulse train in communication with the selected and indicated receiver, and information storing means for receiving from the receiver information represented by the signal and for carrying out the storage thereof, communication between the selected source and the selected receiver being maintained only until the information is stored.

10. Apparatus for receiving alternating current signals as claimed in claim 9 and further comprising, for each trigger device, an output lead, a pulse gate circuit in the output lead and means for pulsing all the pulse gate circuits with pulses coincident with the pulses of the selected pulse train.

References Cited in the file of this patent

UNITED STATES PATENTS

| | | |
|---|---|---|
| 2,317,191 | Holbrook | Apr. 20, 1943 |
| 2,483,445 | Talley | Oct. 4, 1949 |
| 2,490,833 | Ransom | Dec. 13, 1949 |
| 2,619,548 | Lesti | Nov. 23, 1952 |